US008594437B2

(12) United States Patent
Watanabe et al.

(10) Patent No.: US 8,594,437 B2
(45) Date of Patent: Nov. 26, 2013

(54) SIMILAR PICTURE SEARCH APPARATUS

(75) Inventors: Yuki Watanabe, Kokubunji (JP);
Tsuneya Kurihara, Tokyo (JP); Naoto Akira, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 331 days.

(21) Appl. No.: 13/037,720

(22) Filed: Mar. 1, 2011

(65) Prior Publication Data
US 2011/0274360 A1 Nov. 10, 2011

(30) Foreign Application Priority Data
May 6, 2010 (JP) .................... 2010-106561

(51) Int. Cl.
*G06K 9/64* (2006.01)
(52) U.S. Cl.
USPC ........... 382/217; 382/190; 382/195; 382/118; 382/305; 382/218; 382/169; 382/103
(58) Field of Classification Search
CPC ................... G06F 17/30247; G06F 17/30259
USPC ......... 382/217, 190, 195, 118, 305, 218, 169, 382/103
See application file for complete search history.

(56) References Cited

U.S. PATENT DOCUMENTS 6,816,551 B1 11/2004 Kasutani
7,254,311 B2 * 8/2007 Nagasaka et al. ............. 386/241

FOREIGN PATENT DOCUMENTS

JP 2000-339474 12/2000
JP 2009-022018 1/2009

OTHER PUBLICATIONS

Yoshida et al., "Tiny LSH for Content-Based Copied Video Detection," International Symposium on Applications and the Internet, 2008, pp. 89-95.

* cited by examiner

*Primary Examiner* — Mike Rahmjoo
(74) *Attorney, Agent, or Firm* — Antonelli, Terry, Stout & Kraus, LLP.

(57) ABSTRACT

It is an object of this invention to detect a similar picture at high speed with high accuracy from a large-scale picture archive. Previously, a frame is extracted from each picture in a picture archive at fixed time intervals, an image feature quantity is extracted from each extracted frame, and the extracted image feature quantities are clustered, thereby constructing a clustered feature quantity database. A frames search section performs a similar frame search not only for a leading frame of a query picture but also for a subsequent frame, by using the database. A search result integration section checks whether there is a sequence across a plurality of search results and outputs, as a picture similar to the query picture, a segment which is confirmed to be continuous for a certain length or more.

7 Claims, 14 Drawing Sheets

FIG. 3

On main storage side

| Cluster ID | Representative value |
|---|---|
| 1 | -6.168, 10.120, 8.737, 5.274, 8.826, ··· |
| 2 | -4.053, 13.629, 6.802, 3.391, 9.649 ··· |
| ⋮ | ⋮ |

On auxiliary storage side

| Frame ID | Feature quantity |
|---|---|
| 101 | -10.095, 8.676, 8.235, 3.671, 6.689, ··· |
| 201 | -6.487, 9.293, 7.570, 4.607, 8.948, ··· |
| 301 | -4.555, 9.849, 7.474, 4.946, 9.313, ··· |
| ⋮ | ⋮ |
| 401 | -4.427, 12.052, 6.736, 4.078, 9.748, ··· |
| 501 | -5.213, 14.831, 4.909, 2.103, 8.617, ··· |
| ⋮ | ⋮ |
| ⋮ | ⋮ |

FIG. 4

| Start frame ID | End frame ID | Reliability |
|---|---|---|
| 101 | 110 | 10 |
| 301 | 310 | 9 |
| 501 | 510 | 7 |
| ⋮ | ⋮ | ⋮ |

FIG. 8

| Leading frame ID of candidate | The number of votes obtained |
|---|---|
| 101 | 5 |
| 201 | 1 |
| 301 | 4 |
| 401 | 2 |
| 501 | 4 |
| ⋮ | ⋮ |

| Inputted frame ID | Difference between leading frame ID and inputted frame ID | ID of frame subsequent to candidate (ID: 221) | Result frame ID allowed to vote for candidate | |
|---|---|---|---|---|
| 1001 | 0 | 221 | 221 | ~ 221 |
| 1002 | 1 | 222 | 222 | ~ 223 |
| 1003 | 2 | 223 | 222 | ~ 224 |
| 1004 | 3 | 224 | 223 | ~ 226 |
| 1005 | 4 | 225 | 224 | ~ 227 |
| 1006 | 5 | 226 | 225 | ~ 229 |
| 1007 | 6 | 227 | 225 | ~ 230 |
| 1008 | 7 | 228 | 226 | ~ 232 |

SIMILAR PICTURE SEARCH APPARATUS

CLAIM OF PRIORITY

The present application claims priority from Japanese patent application JP 2010-106561 filed on May 6, 2010, the content of which is hereby incorporated by reference into this application.

BACKGROUND OF THE INVENTION

1. Field of the Invention

The present invention relates to a picture search technique for detecting a list of pictures similar to an inputted picture from a large-scale picture archive.

2. Background Art

The spread of digital archiving of TV pictures and moving picture distribution services on the Internet is increasing the need to search in and classify large-scale data at high speed. In particular, there is a need for a picture search technique using an image feature due to the difficulty in manually adding text information to a vast amount of picture content. Since a large-scale picture archive includes the same or similar pictures in large numbers, it is desirable to detect the pictures at high speed as thoroughly as possible. If the picture archive includes pictures whose playback speeds are different, such as a slow-motion picture and a fast-forward picture, detection of the pictures as similar pictures is also desired.

As a still image search method using an image feature, there is proposed a method including performing a search by extracting pieces of information such as color information and shape information of an image itself as pieces of higher dimensional vector information and evaluating the similarity between images on the basis of distances among vectors. A method including implementing a high-speed similarity search even in large-scale image data by clustering pieces of feature quantity data by k-means or the like and holding the clustered pieces is also known.

Known examples of a conventional similar picture search method using an image feature include a method using frame-by-frame feature quantity comparison between a query picture and a candidate for similar pictures. A general procedure of such a conventional method is to 1) capture each frame from a query picture and calculate an image feature quantity, 2) search for a frame whose feature quantity is close to a feature quantity of a leading frame of the query picture in a feature quantity database and set the frame as a candidate, 3) calculate the distances between the feature quantities of subsequent frames of the query picture and feature quantities of frames subsequent to each candidate, and 4) output, as a similar picture, a candidate in which the total value of feature quantity distances for a fixed number of frames or more is not more than a threshold value.

For example, in JP 2009-22018A, an inputted picture is divided into segments, in each of which variation in feature quantity between frames is within a specific range, a feature quantity extracted from a representative frame of each segment is stored in a feature quantity table, a frame similar to a new frame is searched for in the feature quantity table when the new frame is inputted, and all frames meeting conditions are set as candidates for similar frames. When a frame subsequent to the new frame is inputted, whether a feature quantity of the frame coincides with a feature quantity of a frame subsequent to each candidate is checked, and a candidate which coincides in feature quantity with the new frame for a length not less than a threshold value is outputted as a similar picture.

K. Yoshida and N. Murabayashi, "Tiny LSH for Content-based Copied Video Detection," Proc. of SAINT 2008, IEEE CS, 2008 (hereinafter referred to as Non-Patent Document 1) discloses a method for speeding up selection of a candidate from a feature quantity table using a hash table. In this method, a plurality of hash values are calculated for each frame feature quantity by using a plurality of hash functions. The hash functions to be used each generate, from a feature quantity similar to a certain feature quantity, the same hash value as that of the latter feature quantity. A hash table in which a hash value is paired with a pointer to a feature quantity table is created. A pointer to a frame with a similar feature quantity can be obtained by calculating hash values and searching in the hash table when a new frame is inputted. Although hash value collision causes a pointer corresponding to a hash value in question to be overwritten, if there is a pointer paired with any of hash values other than the hash value, a similar frame can be found from the feature quantity table. Since such a candidate selection method adopts an algorithm using a hash table, the complexity of the method is constant regardless of the amount of data.

JP 2000-339474A discloses a method for calculating an accurate similarity in comparing feature quantities of moving images with different frame rates. This method uses means for correcting a frame position at which feature quantity comparison is to be performed while referring to the time position information of a query picture and the time position information of a segment of a picture to be searched for which is included in a database. Since a feature quantity comparison position is determined by using playback position information of a known moving image, a similar picture with a different frame rate can be detected.

SUMMARY OF THE INVENTION

In a conventional method, since feature quantity comparison is performed by using, as candidates, similar pictures in a search result for a leading frame, a similar picture which is not included in the search result for the leading frame cannot be detected. Although available methods for coping with this include the process of identifying all candidates while shifting a leading frame to the next frame may be adopted, such a process requires calculation costs. In the case of a large-scale picture archive in particular, a search in a feature quantity table for candidate selection requires a vast amount of time. If there are a large number of similar pictures, the cost of reading and comparing feature quantities of frames subsequent to each candidate increases.

Candidate selection can be speeded up by using a hash table, as in Non-Patent Document 1. However, if there are a large number of similar pictures, it is highly likely that hash value collision occurs a large number of times and that a feature quantity table has a frame without a pointer from a hash table.

The cost of comparing feature quantities of subsequent frames in a case using a hash table is no different from that in a case without a hash table. In the case of a picture archive so large that all entries of a feature quantity table cannot be stored in a main memory, feature quantity data needs to be stored in an auxiliary storage such as a hard disk, and the cost of reading feature quantities is not negligible.

A large-scale archive may include a picture with a different playback speed. It is desirable to detect such a picture in some applications. In the method of JP 2000-339474A, a position for feature quantity comparison is corrected on the basis of known playback position information. A scene with a playback speed changed for dramatic presentation or the like cannot be detected. Although the process of correcting a comparison position not by using time information but by using a plurality of patterns is also available, it is not practical to perform feature quantity comparison a plurality of times for each of all candidates.

The present invention has as its object to provide a method for performing a similar picture search in picture data as long as tens of thousands of hours at high speed with few detection omissions.

The present invention uses a similar picture search method including performing a search associated with each of a plurality of frames and integrating results of the searches. In this method, comparison with feature quantities of frames subsequent to a candidate is not performed. Instead, a similar frame search is performed instead not only for a leading frame of a query picture but also for a subsequent frame of the query picture, and whether there is a sequence across a plurality of search results is checked. In a general search in a feature quantity table, search time increases with an increase in the number of registrations. According to the present invention, similar frame searches can be performed at high speed by constructing a clustered feature quantity database in advance.

An apparatus for implementing the above-described search method includes an input section which inputs a picture, a database construction section which constructs a feature quantity database from all pictures of a picture archive inputted to the input section, a similar picture search section which searches for a picture similar to a query picture inputted to the input section in the picture archive, and an output section which outputs information on a similar picture retrieved by the similar picture search section. The database construction section extracts a frame from each picture in the picture archive at fixed time intervals, extracts image feature quantities from the extracted frames, clusters the extracted image quantities, and constructs the feature quantity database, and the similar picture search section extracts a frame from the query picture at fixed time intervals, extracts image feature quantities from the extracted frames, searches for a frame similar to each extracted frame of the query picture in the feature quantity database by using the image feature quantities, searches for a sequence across respective similar frame search results for the frames of the query picture, and determines, as a similar picture, a segment which is confirmed to be continuous for a fixed length or more.

The feature quantity database includes a piece of first data obtained by associating an ID of a cluster with a representative value of the cluster and a piece of second data obtained by associating an ID of a frame in each of the cluster with an image feature quantity of the frame, and pieces of the second data in the same cluster are stored in continuous areas of a storage device. The piece of first data is stored in a main storage while the piece of second data is stored in an auxiliary storage.

Assume that continuous integer IDs are assigned to frames extracted at the fixed time intervals from one picture. At the time of similar picture determination, for example, an ID of a frame retrieved as a frame similar to a leading frame of the query picture is registered as a similar picture candidate, an ID which is obtained by subtracting (m−1) from an ID of a frame retrieved as a frame similar to a m-th subsequent frame is set as a voting target for the retrieved frame, a vote is cast for the ID, and one of the candidate with votes obtained, the number of which is not less than a fixed number, is determined to be a similar picture. If a vote is cast on the basis of an integer ID within a fixed range adjacent to the ID serving as the voting target, a similar picture with a different playback speed can be detected. Further, if a candidate serving as the voting target for the frame retrieved as the frame similar to the subsequent frame is unregistered, a similar image which is not included in a search result obtained by using a leading frame of the query picture can be retrieved by registering the ID of the frame as a new candidate.

According to the present invention, since candidates are not limited to ones in a search result for a leading frame, a similar picture failing to be selected as a candidate for the leading frame due to degradation in image quality or a shift in frame sampling point can be detected. The present invention only requires detection of a sequence of continuous frames from search results for a plurality of frames instead of comparison between feature quantities of frames of a query picture and those of a candidate picture. A picture with a different playback speed can also be detected. In a large-scale picture archive including a large number of similar pictures, since feature quantities of frames subsequent to a large number of candidates need not be read, high-speed operation is achieved.

BRIEF DESCRIPTION OF THE DRAWINGS

FIG. 3 is a chart showing structures of a feature quantity database.

FIG. 4 is a chart showing similar picture information structures.

FIG. 8 is a chart showing structures of a candidate table.

DETAILED DESCRIPTION OF THE PREFERRED EMBODIMENTS

A preferred embodiment of the present invention will be described in detail below with reference to the drawings.

Figure 1:
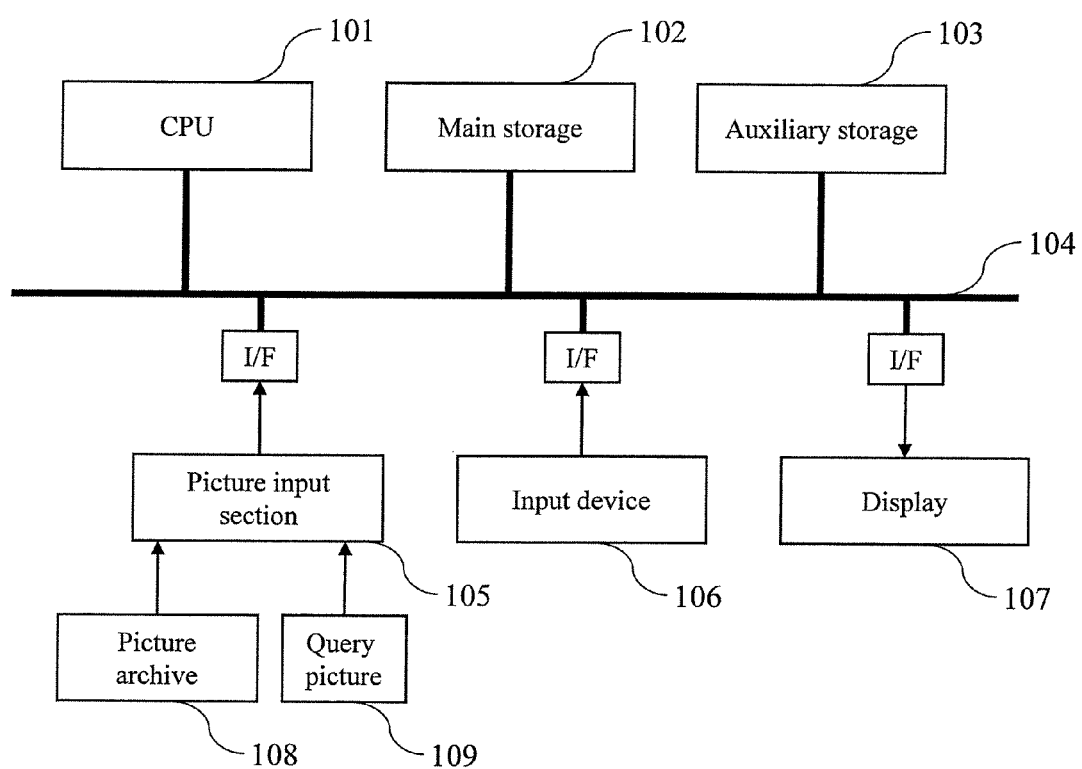
FIG. 1 is a diagram showing an example of the hardware configuration of a similar picture search apparatus according to the present invention.

FIG. 1 is a diagram showing an example of the hardware configuration of a similar picture search apparatus according to the present invention. A similar picture search apparatus according to an embodiment of the present invention can be implemented on a common computer.

The similar picture search apparatus according to this embodiment includes a CPU 101, a main storage 102, an auxiliary storage 103, a picture input section 105, an input device 106, and a display 107. The CPU 101, the main storage 102, and the auxiliary storage 103 are connected to each other by a data bus 104 and are connected to the picture input section 105, the input device 106, and the display 107 via interfaces (I/Fs). The CPU 101 performs various types of processing by executing programs stored in the main storage 102. The main storage 102 is a storage device which allows direct access from the CPU 101 and corresponds to a main memory in a common computer. The main storage 102 stores an executable program and data being processed. The auxiliary storage 103 is a mass storage device such as a hard disk. The auxiliary storage 103 stores feature quantity data extracted from a picture archive. The picture input section 105 is an input interface for taking in a picture archive 108 and a query picture 109. The input device 106 is an input interface for notifying a computer of a user action, including a mouse and a keyboard. The display 107 is a display device such as a liquid crystal display or a CRT and is an output interface for notifying a user of an execution result.

Figure 2:
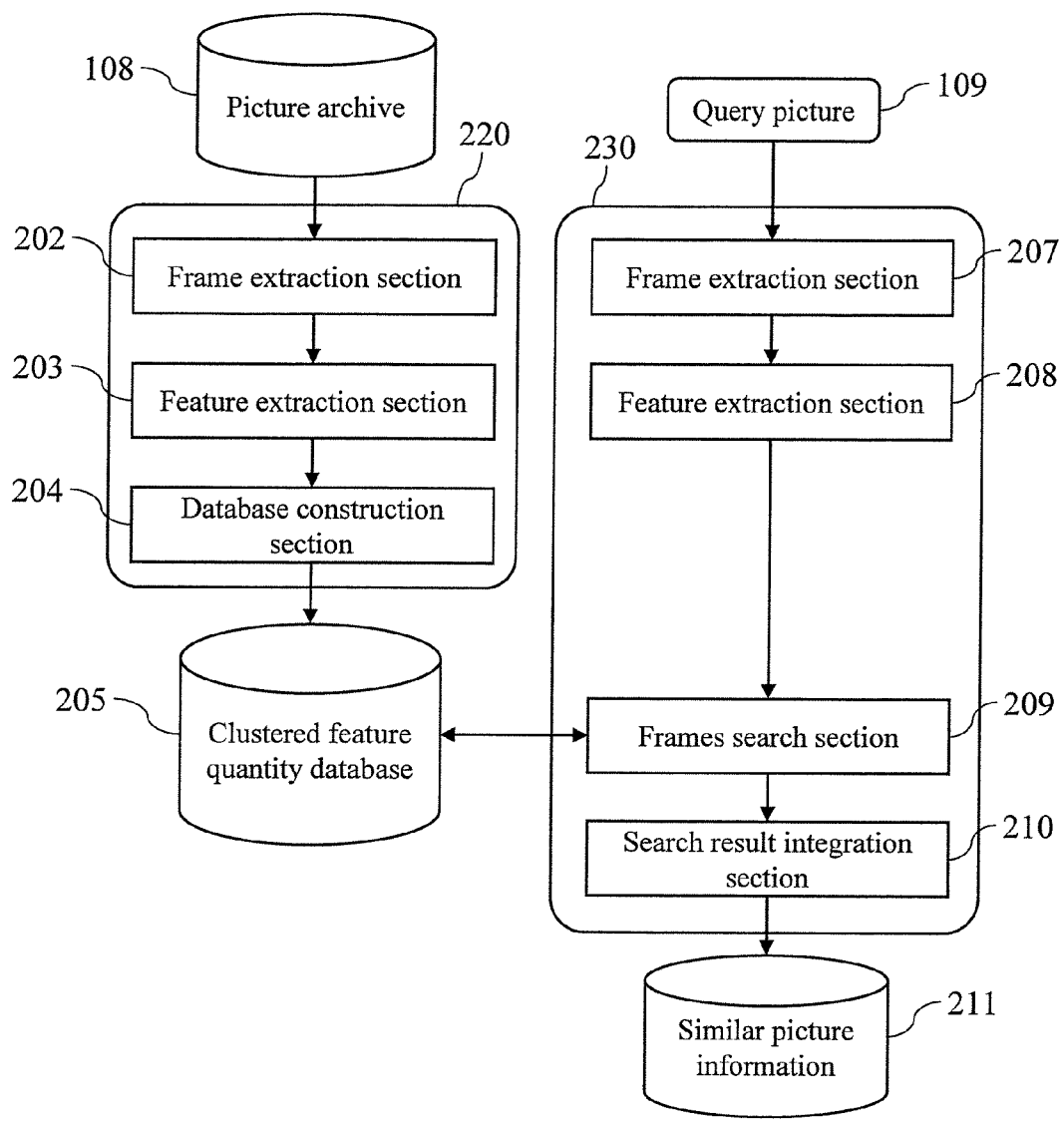
FIG. 2 is a functional block diagram for explaining processing of the similar picture search apparatus according to the present invention.

FIG. 2 is a functional block diagram for explaining processing of the similar picture search apparatus according to the present invention. The similar picture search apparatus according to the present invention includes a feature quantity database construction section 220 and a similar picture search section 230. The feature quantity database construction section 220 and the similar picture search section 230 are implemented by the CPU 101 executing a program stored in the main storage 102.

The feature quantity database construction section 220 constructs a clustered feature quantity database 205 from all picture files in the picture archive 108 to be searched. First, a frame extraction section 202 decodes an inputted picture file and captures a frame at fixed time intervals. A feature extraction section 203 calculates an image feature quantity from each frame by a known method. An image feature quantity is obtained by digitizing a color feature, a shape feature, and the like and is represented by fixed-length vector data. Vector data with tens to hundreds of dimensions is generally required to obtain a significant image search result from a large-scale image database, depending on the design specification. The database construction section 204 clusters pieces of feature quantity data and writes a result of the clustering as the clustered feature quantity database 205 to the storage devices.

The clustered feature quantity database 205 is represented by the structures in FIG. 3. Referring to FIG. 3, a cluster information structure is stored in the main storage. A piece of cluster information is composed of a cluster ID and representative values. A representative value is the average value of feature quantities of cluster elements. As shown in FIG. 3, a piece of frame feature quantity information is stored in the auxiliary storage. A piece of feature quantity information is composed of a frame ID and feature quantities. A frame ID is an integer value representing a unique number given to each frame. Continuous IDs are assigned to temporally continuous frames. A feature quantity is fixed-length vector data. Pieces of feature quantity information are stored in continuous areas of the auxiliary storage on a cluster-by-cluster basis. In a search in the clustered feature quantity database, the distances between feature quantities of a query image and representative values of each cluster are first calculated, and a cluster with smaller distances is selected. Sets of pieces of feature quantity data in the selected cluster are read from the auxiliary storage, are sorted in ascending order of feature quantity distance, and are outputted. At this time, areas serving as data read targets of the auxiliary storage can be calculated from, for example, a maximum value n of the number of cluster elements and a cluster ID of x as: xn to (x+1)n−1.

Referring back to FIG. 2, the similar picture search section 230 searches for a picture similar to the query picture 109 in the picture archive 108 and outputs a search result as similar picture information 211. First, a frame extraction section 207 extracts a frame from the query picture 109 at fixed intervals. The extraction interval need not be equal to that used in the frame extraction section 202. A feature extraction section 208 then extracts an image feature quantity from each frame. The feature quantities are calculated with the same algorithm as that for the feature extraction section 203. A frames search section 209 and a search result integration section 210 perform a similar image search across a plurality of frames extracted by the frame extraction section 207 and perform similar picture determination by searching for a sequence across results of the search. These processes characterize the present invention and will be described in detail below. Note that either one of the frame extraction section 202 of the feature quantity database construction section 220 and the frame extraction section 207 of the similar picture search section 230 may also serve as the other. Similarly, either one of the feature extraction section 203 of the feature quantity database construction section 220 and the feature extraction section 208 of the similar picture search section 230 may also serve as the other.

Finally, the similar picture search section 230 outputs the similar picture information 211. The outputted similar picture information 211 forms structures shown in FIG. 4. Each structure of the similar picture information is composed of a start frame ID, an end frame ID, and reliability. A combination of a start frame ID and an end frame ID represents a picture segment similar to a query picture. Reliability is a value representing the similarity between the query picture and a detected picture.

Figure 5:
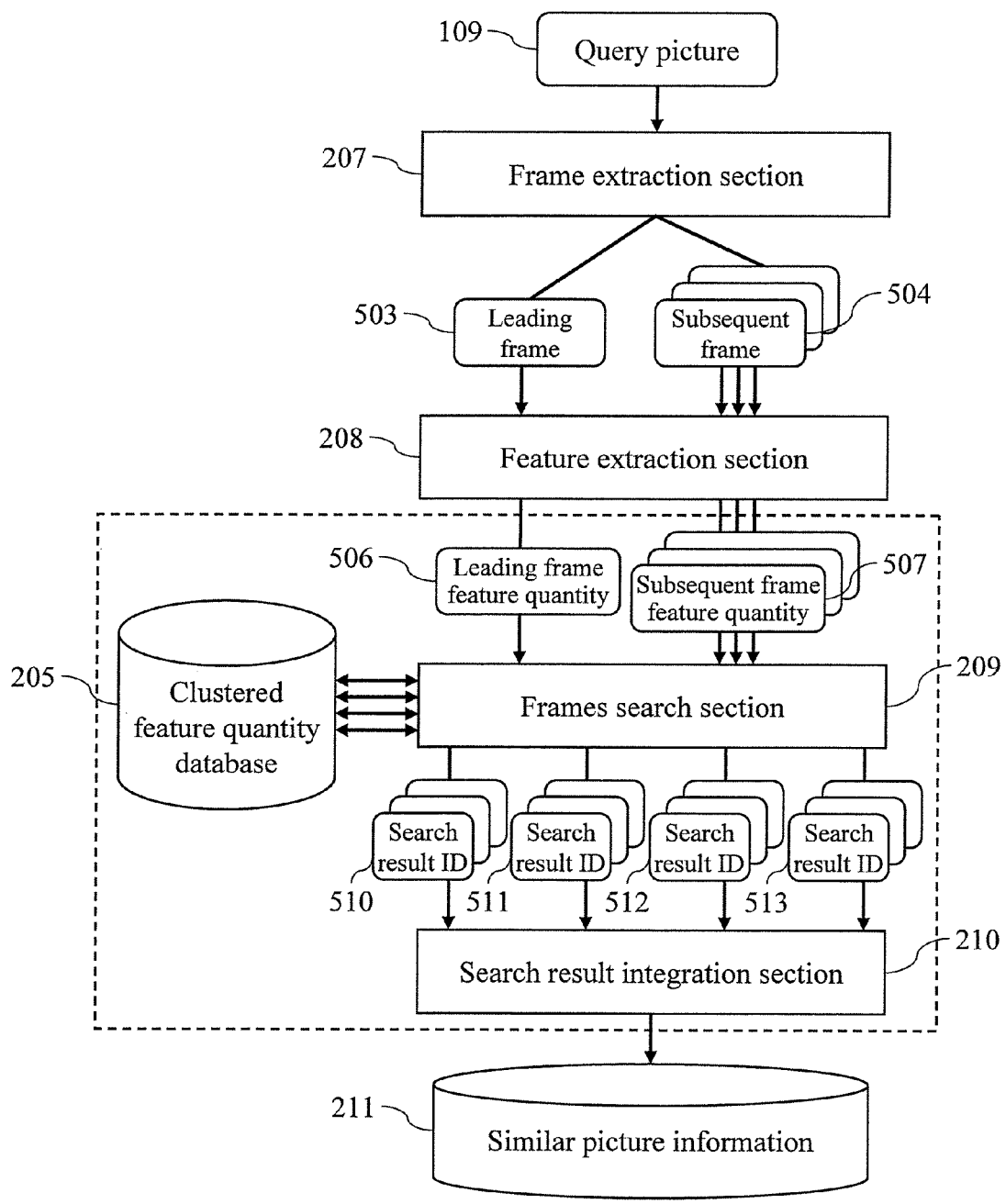
FIG. 5 is a diagram showing a data flow of a similar picture search section.

The operation of the similar picture search section 230 will be described in detail. FIG. 5 is a chart showing a data flow for the similar picture search section 230. The frame extraction section 207 extracts a leading frame 503 from the query picture 109 and then extracts a subsequent frame 504 at fixed intervals. Although the leading frame and the subsequent frames are separately shown in FIG. 5, the frames are all processed in the same manner. The feature extraction section 208 extracts image feature quantities 506 and 507 from the frames. The frames search section 209 retrieves IDs of similar frames from the clustered feature quantity database 205 by using the feature quantities of the frames. Results of the search are lists of frame IDs, and each list has elements, the number of which is not more than a search result upper limit N set by the apparatus. For example, in the case of a TV picture archive as long as tens of thousands of hours, N is assumed to be about 1000. As the results of the search, search result ID lists 510 to 513 are obtained for the frames. The search result integration section 210 searches for a sequence of continuous IDs across the plurality of search result ID lists. If any sequence of continuous IDs is recognized as having a length not less than a fixed length, the sequence is outputted as a piece of the similar picture information 211.

Figure 6:
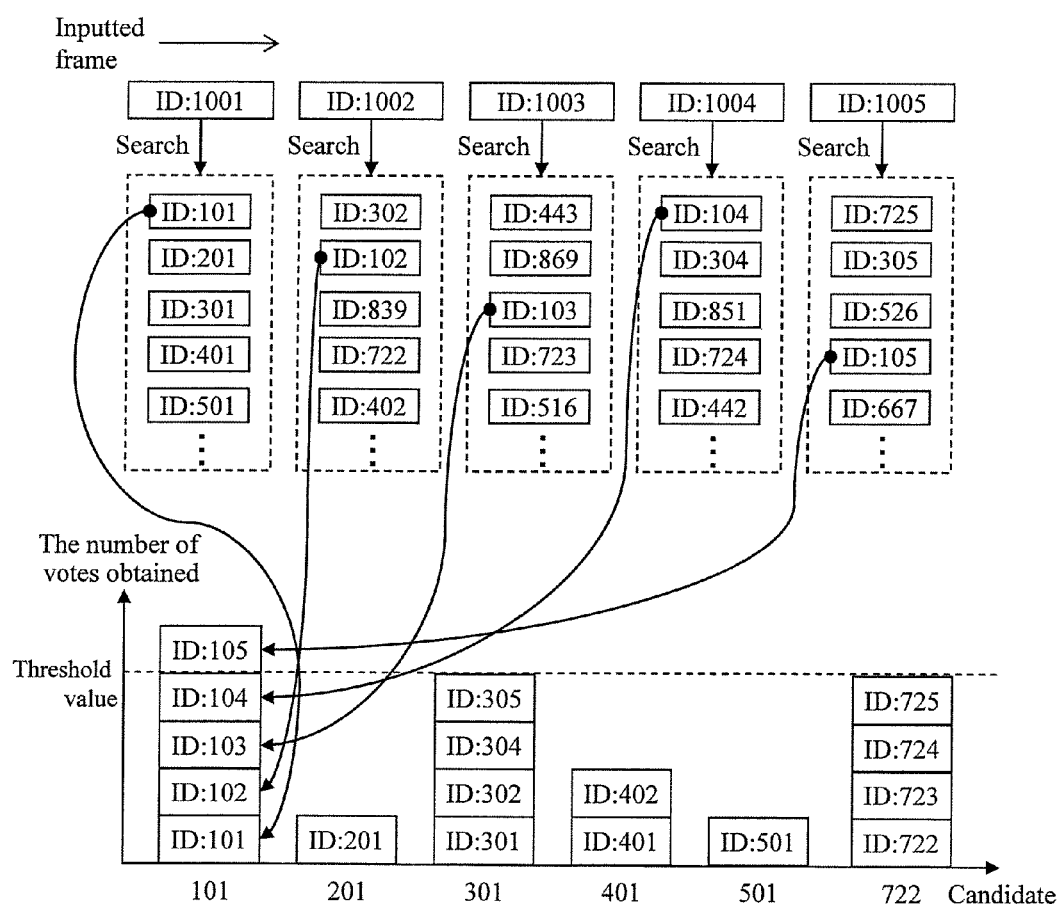
FIG. 6 is a schematic chart for explaining an example of the operation of a search result integration section.

FIG. 6 is a schematic chart showing the operation of the search result integration section 210. The search result integration section 210 uses the process of voting for a candidate as in FIG. 6 to search for a sequence of continuous IDs across search results. In this example, an ID of 101 is regarded as a candidate, and votes are cast for the ID of 101 on the basis of search result IDs, i.e., an ID of 102, an ID of 103, an ID of 104, and an ID of 105 included in search results for the second, third, fourth, and fifth frames. When five frames are processed, the number of votes obtained of the ID of 101 is 5, and a frame with the ID of 101 is determined to be a similar picture. At this time, a start frame ID of 101, an end frame ID of 105, and the number (5) of votes obtained as reliability are outputted as a piece of similar picture information.

With this method, a similar picture with a specific frame failing to be retrieved can be detected by adjusting a threshold value for similar picture determination. For example, assume that an ID of 301 is regarded as a candidate. In this case, a frame ID close to the ID of 301 is not included in the search result for the third frame. However, if the final number of votes obtained is not less than the threshold value, a frame with the ID of 301 is determined to be a similar picture. Also, the method can detect a candidate which is not included in a search result for a leading frame. For example, a frame ID close to an ID of 722 is not included in the search result for the leading frame. However, if close frame IDs, the number of which is not less than the threshold value, are included in search results for frames subsequent to the leading frame, a frame with the ID of 722 is determined to be a similar picture.

Figure 7:
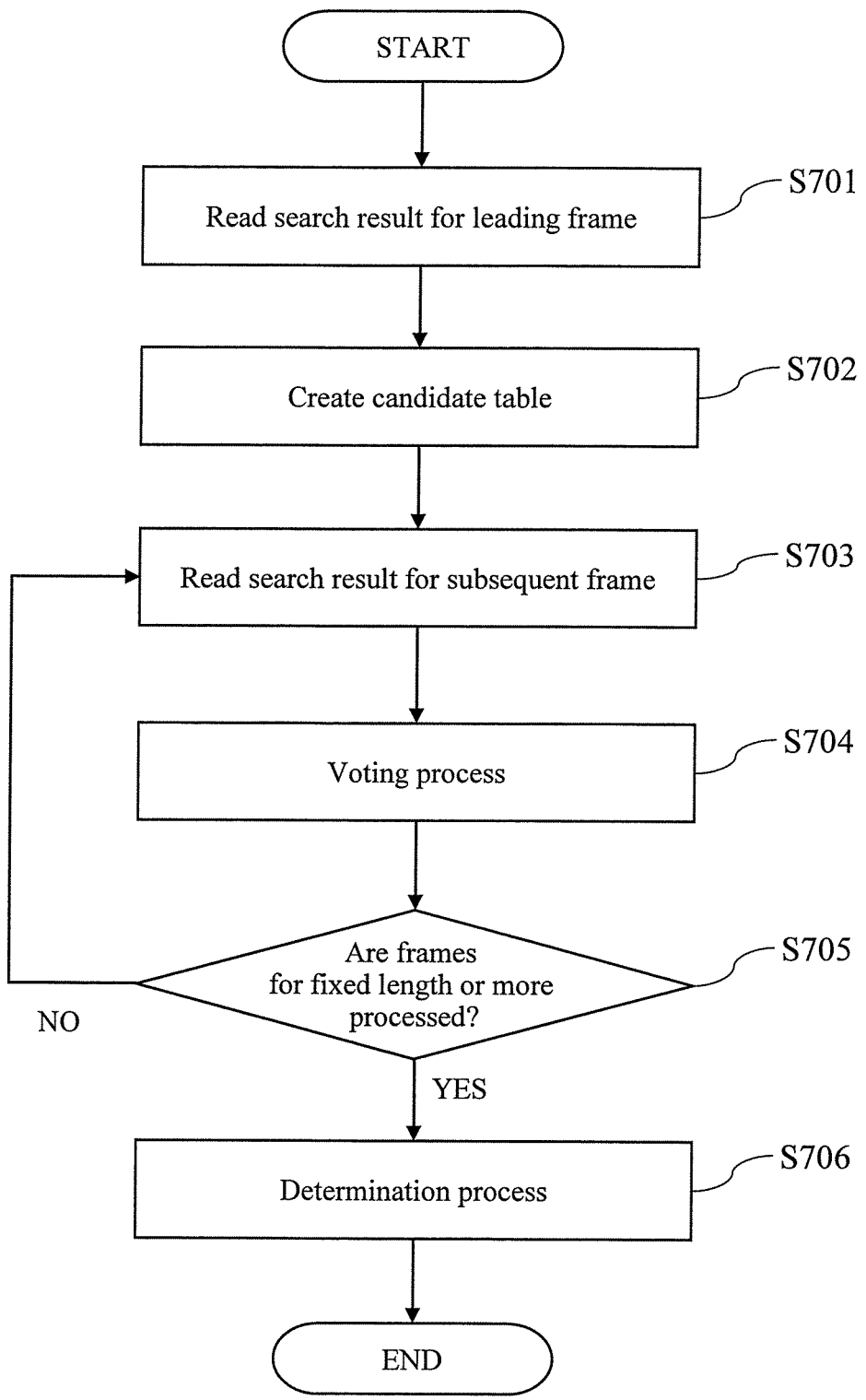
FIG. 7 is a flow chart showing an example of the procedure for the search result integration section.

The operation of the search result integration section 210 according to the present invention will be described with reference to the flow chart in FIG. 7. First, in step 701, the search result 510 for the leading frame is read. The search result is a list of frame IDs. The number of elements in the search result is assumed to be about 1000, depending on the design specification. In step 702, a candidate table is created. The candidate table includes structures shown in FIG. 8. All frame IDs read in step 701 are written as the leading frame IDs of candidates to the candidate table. The numbers of votes obtained for the candidates are set to 1. In step 703, a search result for a subsequent frame is read. The search result is a list of frame IDs. In step 704, a voting process is performed on the candidates on the basis of the search result for the subsequent frame. The voting process will be described in detail later with reference to FIG. 9. In step 705, the number of times the voting process is performed is checked. If the number of times reaches a fixed number, the flow advances to step 706; otherwise, the flow returns to step 703 to perform voting by using a search result for the next frame. In step 706, the numbers of votes for the candidates in the candidate table are checked, and one of the candidates whose number of votes is not less than a threshold value is outputted as a similar picture. The threshold value used here is an integer value not more than the number of processed frames and depends on the design specification. By making the threshold value smaller than the number of processed frames, even a candidate, a frame ID close to the candidate not being included in an image search result for a specific frame due to degradation in image quality or a shift in frame sampling point, can be detected as a similar picture.

Figure 9:
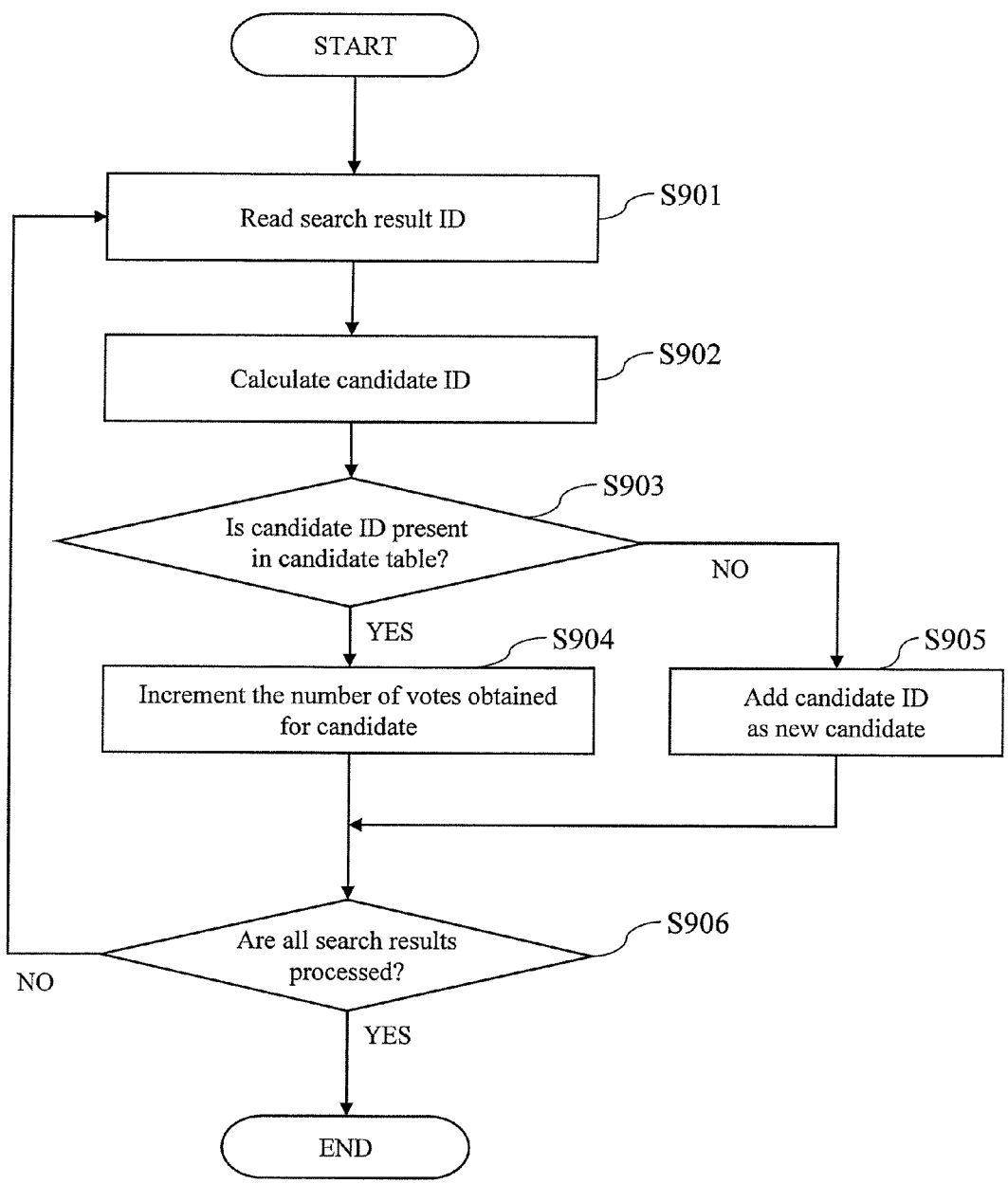
FIG. 9 is a flow chart showing the procedure for a voting process by the search result integration section.

The operation of the voting process in step 704 of FIG. 7 will be described with reference to the flow chart in FIG. 9. First, in step 901, a first element (search result ID) is read from a search result list. In step 902, a candidate ID to be voted for is calculated from the difference between the ID of a current query frame and that of a leading frame. For example, if an ID in a search result for the fifth frame is 305, an ID of 301 is a candidate to be voted for. In step 903, it is checked whether the candidate ID calculated in step 902 is present in the candidate table. If the candidate ID is present, the number of votes for the candidate is incremented in step 904. If the candidate ID is not found, the flow advances to step 905 to add the candidate ID as a new candidate to the candidate table. In step 906, it is checked whether all elements in the search result list are processed. If an unprocessed element is left, the flow returns to step 901; otherwise, the voting process ends.

Figure 10:
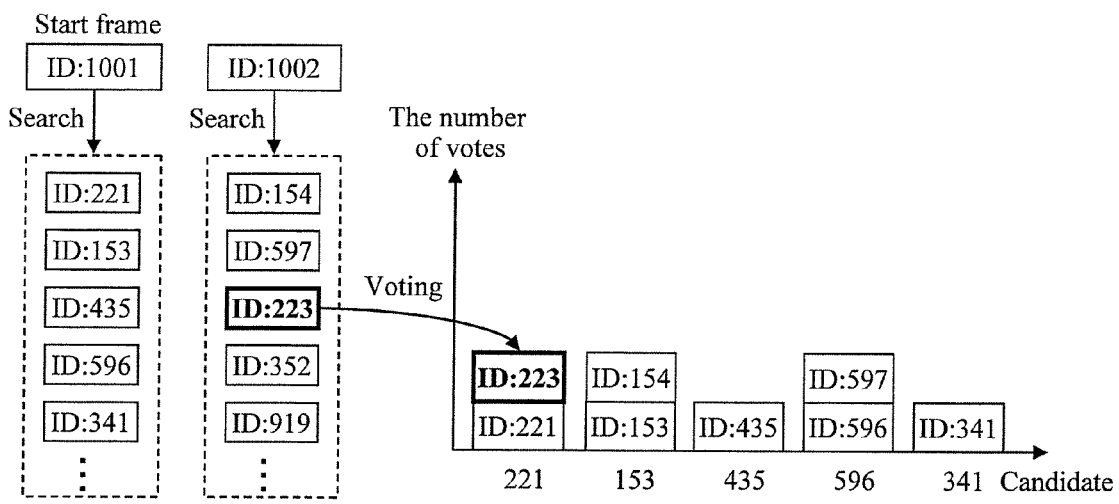
FIG. 10 is a schematic chart for explaining a search for a picture whose playback speed is different.

In the above description, a result of performing the calculation (search result ID)−{(ID of query frame)−(ID of leading frame)} is used as a candidate ID to be voted for. For this reason, in the case of a picture with a different playback speed or a picture with a different frame sampling interval, votes may not be cast for an appropriate candidate. According to this method, the problem can be solved by offering choices for a candidate ID to be voted. FIG. 10 is a schematic chart showing an example of the operation. In this example, a vote is cast for a candidate ID of 221 on the basis of a search result ID of 223 for the second frame. The table in the lower part of FIG. 10 is a correspondence table showing result frame IDs, for which voting for the candidate ID of 221 is allowed, for each inputted frame ID. The correspondence table in this example is one which allows detection of from a 0.7-times speed similar picture to a 1.5-times speed similar picture. A candidate ID can be looked up only by simple comparison between integers. Note that it is necessary to inhibit the same candidate from being voted for a plurality of times on the basis of a search result for a certain frame. This method allows detection of a picture with a different playback speed without performing preprocessing including frame extraction and feature quantity extraction again and without use of special time information.

Figure 11:
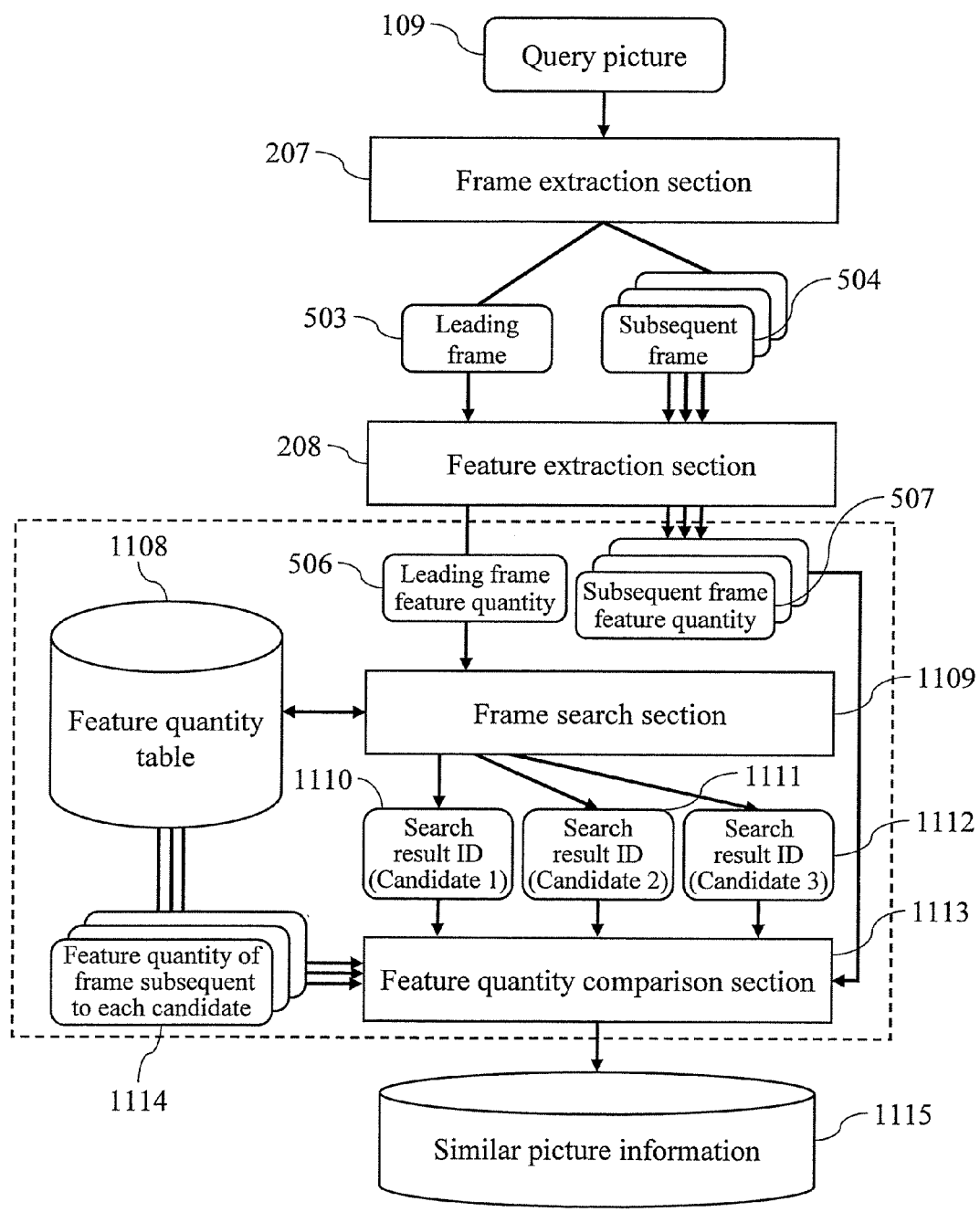
FIG. 11 is a diagram showing a data flow of a similar picture search section in a conventional method.

FIG. 11 shows a data flow of a similar picture search in a conventional method. The data flow is significantly different from the data flow (FIG. 5) according to the present invention in processing surrounded by a broken line. In the conventional method, search result IDs 1110 to 1112 are obtained from a feature quantity table 1108 by using a leading frame feature quantity 506 calculated by a feature extraction section 208, and the search result IDs 1110 to 1112 are regarded as candidates. A feature quantity comparison section 1113 reads feature quantities 1114 of frames subsequent to each candidate from the feature quantity table 1108 and calculates the distances between the subsequent frame feature quantities 1114 and feature quantities 507 of subsequent frames of a query picture. If the total value of frame feature quantity distances for a fixed number of frames or more is not more than a threshold value, the candidate is outputted as a similar picture.

A frame search section 1109 selects a candidate from a search result for a leading frame in the conventional method. Accordingly, if the leading frame of a similar picture is not included in the search result for the leading frame due to degradation in image quality or a shift in frame sampling point, the similar picture cannot be detected. Available methods for solving this problem include the process of performing same processing on subsequent frames and putting up candidates. If there are a large number of candidates, processing costs required to read subsequent frame feature quantities from a feature quantity table and comparing the subsequent frame feature quantities increase. The process is thus not suitable for searching in large-scale data.

Figure 12:
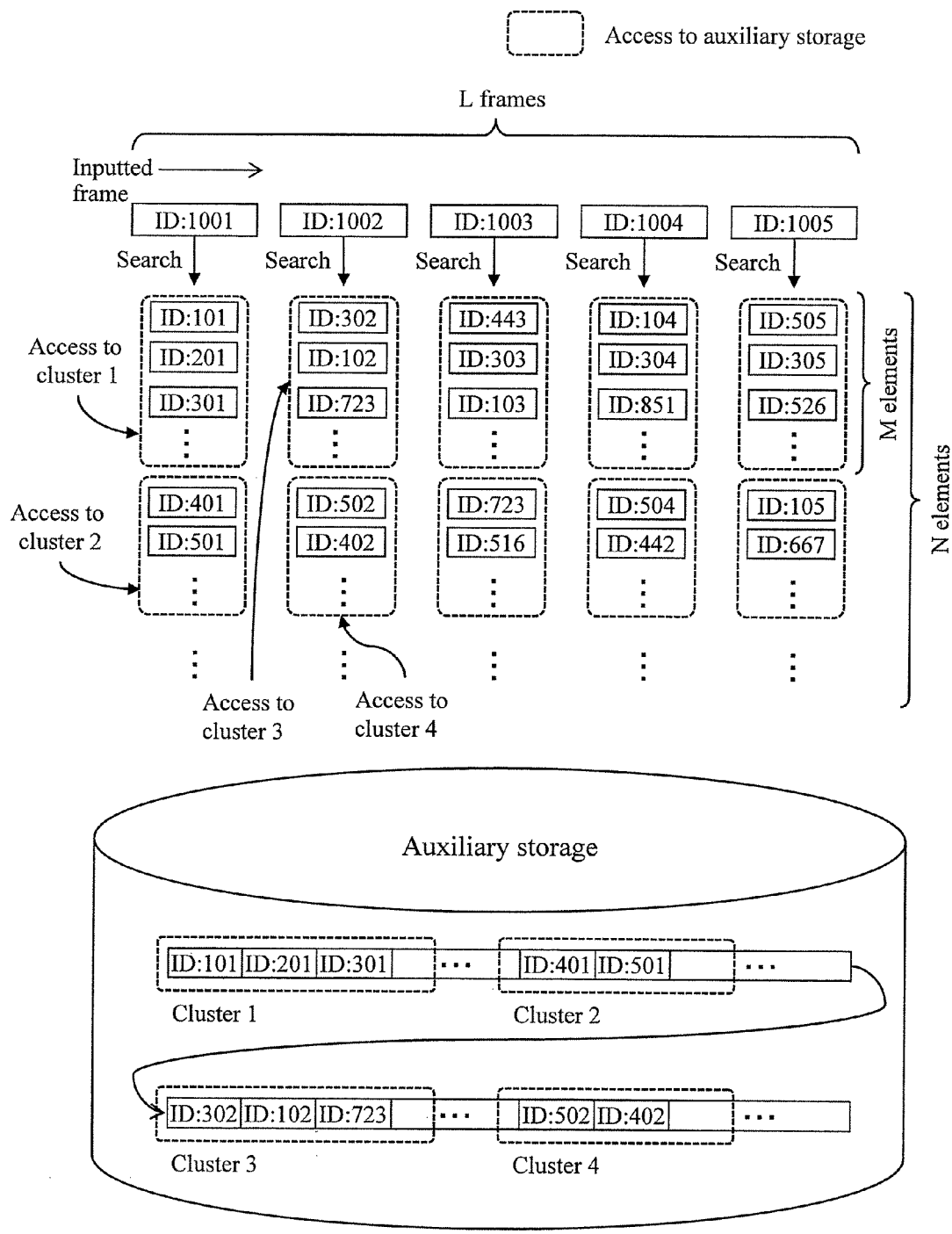
FIG. 12 is a schematic chart for explaining the number of accesses to an auxiliary storage according to the present invention.

The number of accesses to an auxiliary storage when the present invention is used will be described with reference to the schematic chart in FIG. 12. In an image search in a clustered database, the distances between feature quantities of a query image and cluster representative values are calculated, several clusters with smaller distances are selected, and pieces of data corresponding to the clusters are read from an auxiliary storage. Since the pieces of data of each cluster are stored in continuous areas of the auxiliary storage, the pieces of data can be collectively obtained in one read operation.

Letting N be the upper limit of the number of search results, and M be the average number of elements in a cluster, the number of read operations required for one search is Ceil(N/M), where Ceil( ) is an operator which rounds up to the next larger integer. Letting L be the number of frames in a query picture, the total number of accesses to the auxiliary storage required for a similar picture search process is L×Ceil(N/M). For example, in FIG. 12, clusters 1 and 2 are selected to obtain a search result for the first frame, and pieces of data are read from corresponding areas of the auxiliary storage. The same applies to a search associated with a subsequent frame.

Figure 13:
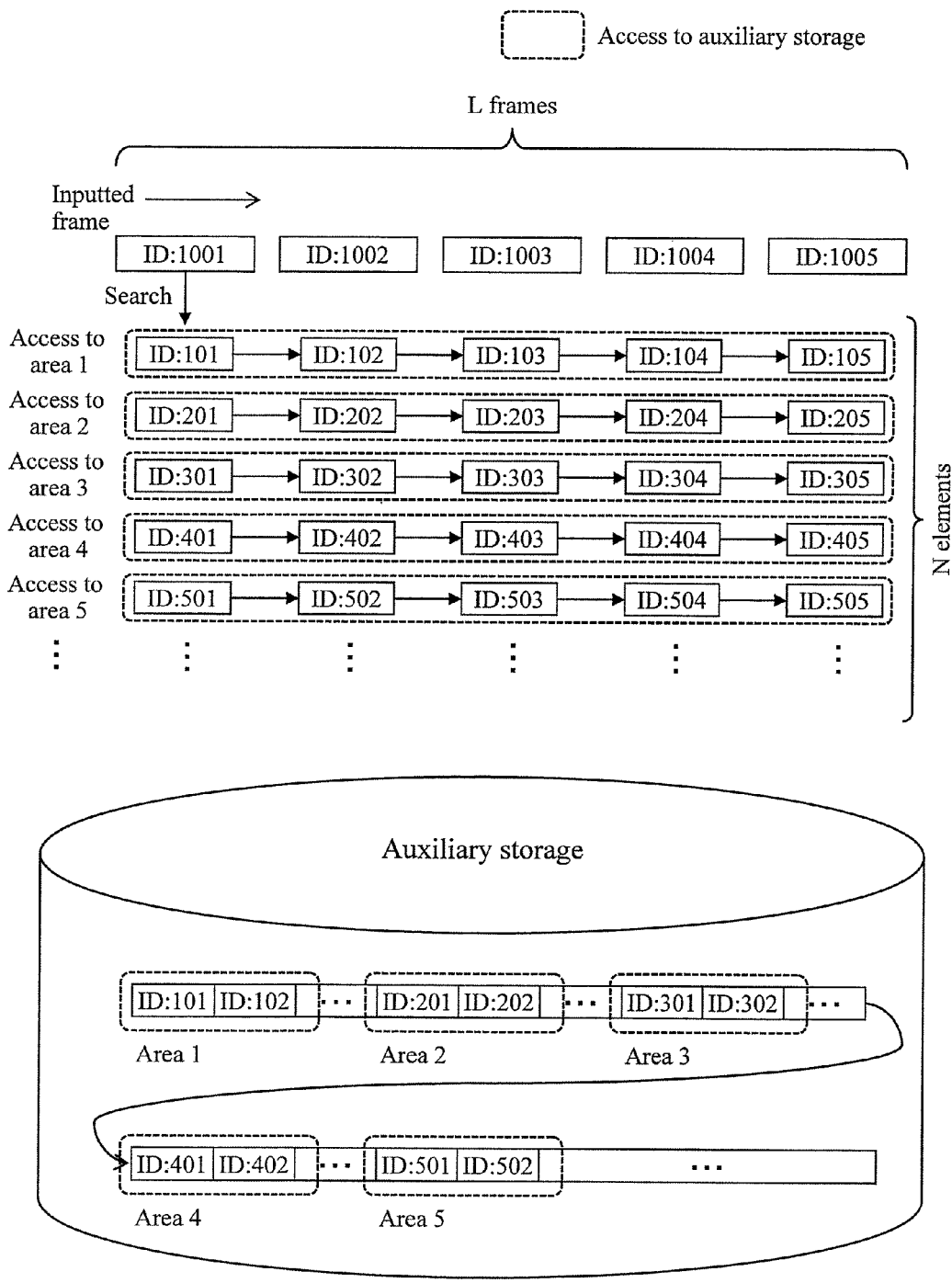
FIG. 13 is a schematic chart for explaining the number of accesses to an auxiliary storage in a conventional method.

The number of accesses to an auxiliary storage when a conventional method is used will be described with reference to the schematic chart in FIG. 13. For ease of explanation, the number of accesses in a search associated with a leading frame is neglected. In the conventional method, when candidates are selected from a search result for the leading frame, feature quantities of frames subsequent to each candidate are read from the auxiliary storage. Assuming that pieces of data are stored in ascending order of frame ID, the number of accesses when pieces of data are read from continuous areas needs to be equal to the number N of candidates.

Assume a case where the upper limit N of the number of search results (=the number N of candidates) is 1000, the average number of cluster elements is 500, and the number L of frames in a query picture is 10, as an example with a picture archive as long as tens of thousands of hours in mind. The number of accesses when the present invention is used is 10×Ceil(1000/500)=20. The number of accesses to an auxiliary storage is significantly reduced, compared to the number N=1000 in a conventional method.

Figure 14:
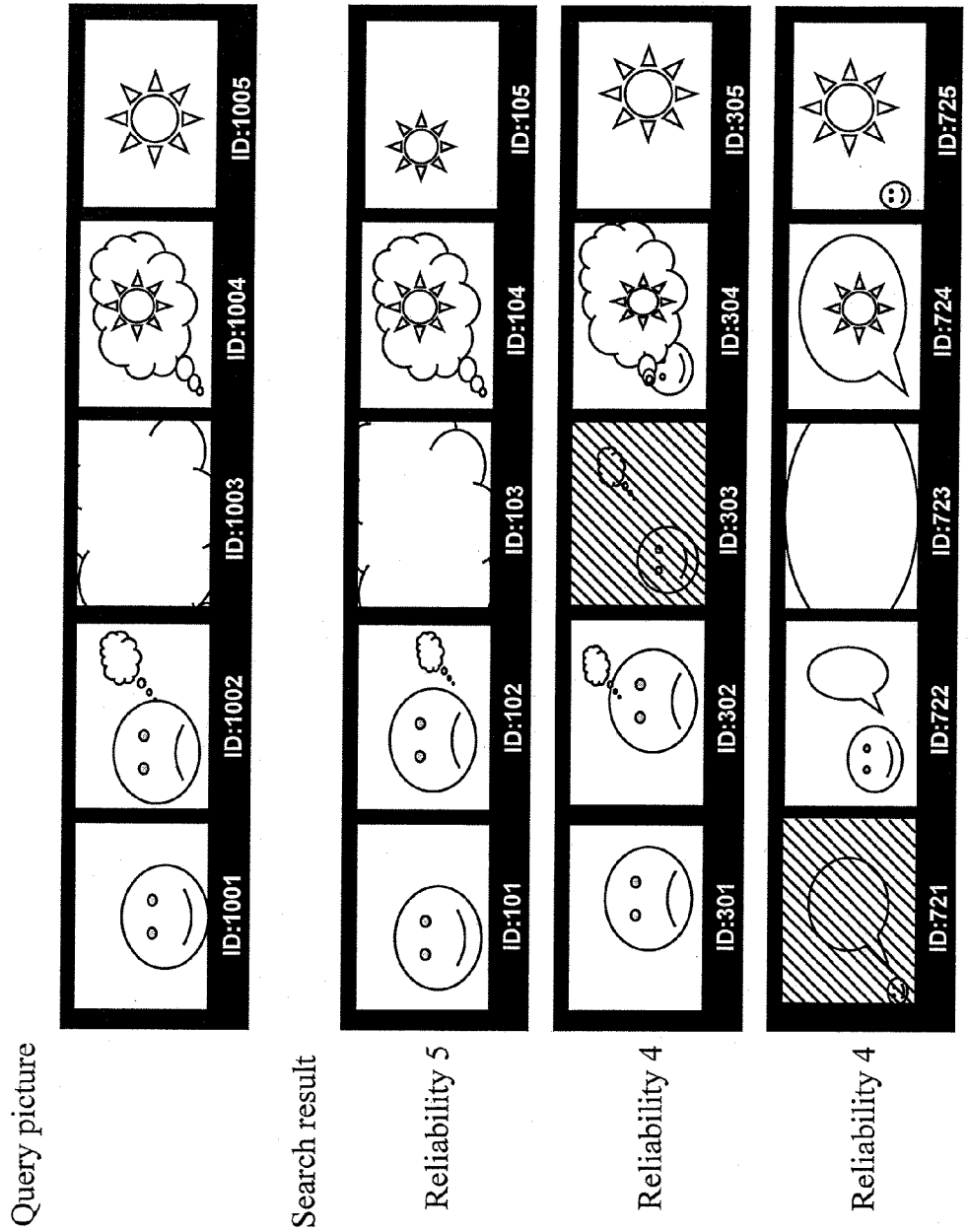
FIG. 14 is a view showing an example of a screen on which similar picture information is displayed, according to the present invention.

FIG. 14 is a view showing an example of a display screen for notifying a user of similar picture information. The thumbnail images and the frame IDs of frames of a query picture are displayed in the upper part of the screen. Pieces of time information corresponding to the frame IDs may be displayed instead of the frame IDs. Detected similar pictures are displayed in the lower part of the screen. Values of reliability are displayed for the search results, and the similar pictures have been sorted in descending order of reliability. Frames (frames with an ID of 303 and an ID of 721 in this example) which are not included in search results at the time of the voting process are displayed, e.g., as thumbnail images with lowered brightness values. With this configuration, a user can learn which part of a picture presented as a search result is not similar.

Figure 15:
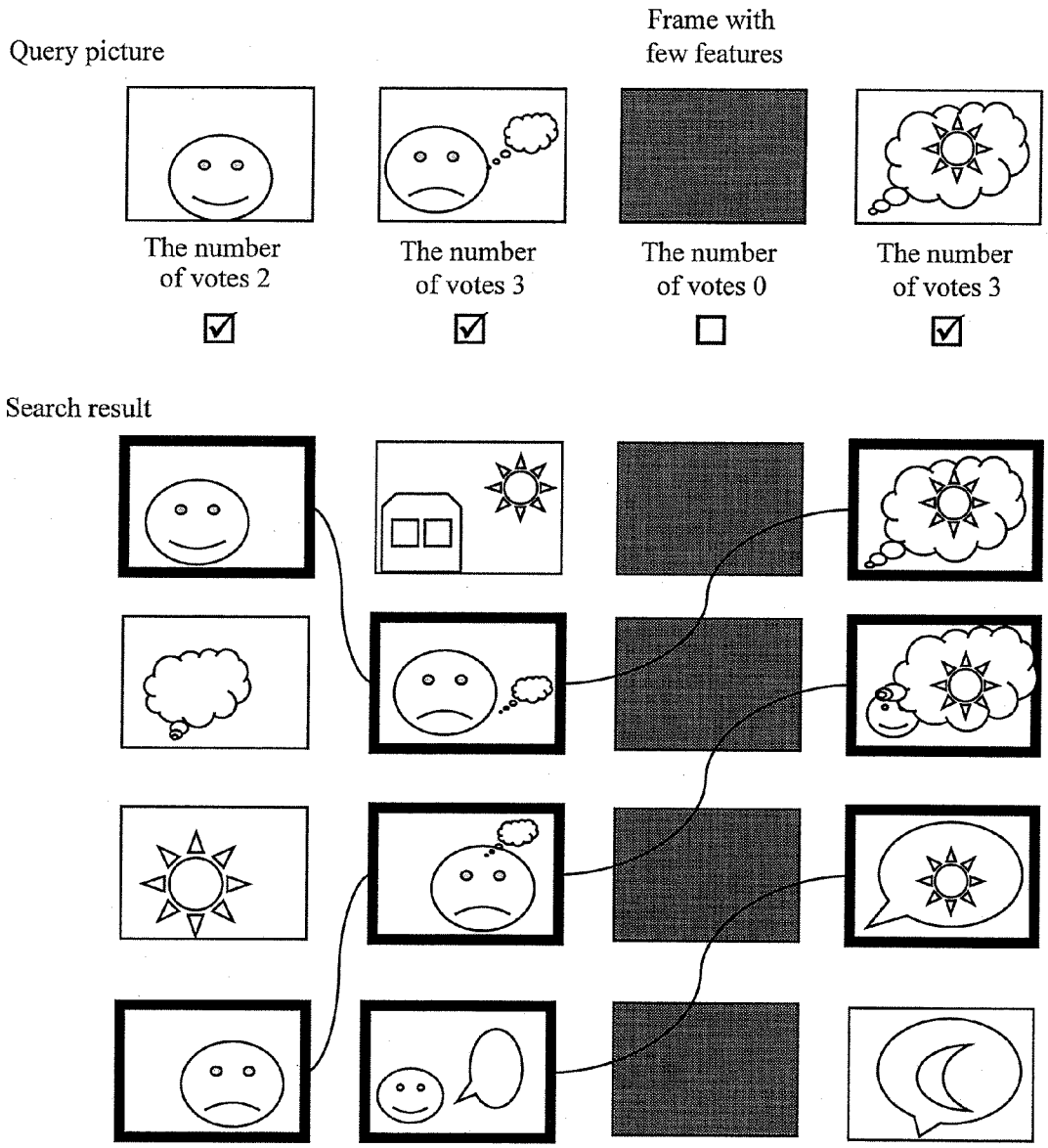
FIG. 15 is a view showing an example of the screen on which similar picture information is displayed, according to the present invention.

FIG. 15 is a view showing an example of a display screen for a user to notify a system of a criteria for a similar picture while checking search results. The thumbnail images of frames of a query picture are displayed in the upper part of the screen. Thumbnail images as a search result for each frame are displayed in the lower part of the screen. Of the search results, thumbnail images which are confirmed to be continuous are highlighted. The number of votes based on the search result for the frame is displayed under each frame of the query picture.

For example, if a frame with few image features is a search query in a blackout scene of a moving image, a search result for the frame may include few IDs close to the IDs of candidates. In this case, the total number of votes obtained for the candidates decreases to adversely affect a result of detection of a similar picture. For this reason, a user checks thumbnails and the number of votes in a search result for each frame and instructs the system not to use a frame with few features. For example, in FIG. 15, the third frame is a frame with few features. A user instructs the system not to use a search result for the third frame by unchecking a checkbox under the thumbnail of the third frame. The system performs the process of canceling voting based on the search result for the frame, performs determination again after lowering a threshold value, and reflects a result of the determination in a search result screen.

Description of Symbols

101 CPU
102 main storage
103 auxiliary storage
104 data bus
105 picture input section
106 input device
107 display
108 picture archive
109 query picture
202 frame extraction section
203 feature extraction section
204 database construction section
205 clustered feature quantity database
207 frame extraction section
208 feature extraction section
209 frames search section
210 search result integration section
211 similar picture information
220 feature quantity database construction section
230 similar picture search section
1108 feature quantity table
1109 frame search section
1113 feature quantity comparison section
1115 similar picture information

What is claimed is:

1. A similar picture search apparatus comprising:
an input section which inputs a picture;
a database construction section which constructs a feature quantity database from all pictures of a picture archive inputted to the input section;
a similar picture search section which searches for a picture similar to a query picture inputted to the input section in the picture archive; and
an output section which outputs information on a similar picture retrieved by the similar picture search section,
wherein the database construction section extracts a frame from each picture in the picture archive at fixed time intervals to provide a plurality of extracted frames, extracts image feature quantities from the extracted frames, clusters the extracted image quantities, and constructs the feature quantity database, and
the similar picture search section extracts frames from the query picture at fixed time intervals, extracts image feature quantities from frames extracted from the query picture at the fixed time intervals, searches for a frame similar to each extracted frame of the query picture in the feature quantity database by using the image feature quantities, searches for a sequence of continuous IDs across respective similar frame search results for the frames of the query picture, and determines, as a similar picture, a sequence of continuous IDs which is confirmed to have a length not less than a fixed length
wherein continuous integer IDs are assigned to frames extracted at the fixed time intervals from one picture, an ID of a frame retrieved as a frame similar to a leading frame of the query picture is registered as a similar picture candidate, an ID which is obtained by subtracting (m−1) from an ID of a frame retrieved as a frame similar to a m-th subsequent frame is set as a voting target for the retrieved frame, a vote is cast for the ID, and one of the candidate with votes obtained, the number of which is not less than a fixed number, is determined to be a similar picture.

2. The similar picture search apparatus according to claim 1, wherein the feature quantity database includes a piece of first data obtained by associating an ID of a cluster with a representative value of the cluster and a piece of second data obtained by associating an ID of a frame in each of the clusters with an image feature quantity of the frame, and pieces of the second data in the same cluster are stored in continuous area of a storage device.

3. The similar picture search apparatus according to any one of claim 2, wherein continuous integer IDs are assigned to frames extracted at the fixed time intervals from one picture, an ID of a frame retrieved as a frame similar to a leading frame of the query picture is registered as a similar picture candidate, an ID which is obtained by subtracting (m−1) from an ID of a frame retrieved as a frame similar to a m-th subsequent frame is set as a voting target for the retrieved frame, a vote is cast for the ID, and one of the candidate with votes obtained, the number of which is not less than a fixed number, is determined to be a similar picture.

4. The similar picture search apparatus according to claim 3, wherein if a candidate serving as the voting target for the frame retrieved as the frame similar to the subsequent frame is unregistered, the ID of the frame is registered as a new candidate.

5. The similar picture search apparatus according to claim 3, wherein a vote is cast for an integer ID within a fixed range adjacent to the ID serving as the voting target.

6. The similar picture search apparatus according to claim 1, wherein if a candidate serving as the voting target for the frame retrieved as the frame similar to the subsequent frame is unregistered, the ID of the frame is registered as a new candidate.

7. The similar picture search apparatus according to claim 1, wherein a vote is cast for an integer ID within a fixed range adjacent to the ID serving as the voting target.

* * * * *